(12) United States Patent
Hamano et al.

(10) Patent No.: US 8,368,968 B2
(45) Date of Patent: Feb. 5, 2013

(54) IMAGING APPARATUS AND IMAGE CORRECTION METHOD

(75) Inventors: Yukiko Hamano, Kanagawa (JP); Naoki Moniwa, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 850 days.

(21) Appl. No.: 12/431,342

(22) Filed: Apr. 28, 2009

(65) Prior Publication Data

US 2009/0290198 A1    Nov. 26, 2009

(30) Foreign Application Priority Data

May 21, 2008   (JP) ................................ 2008-132892

(51) Int. Cl.
*H04N 1/04* (2006.01)
(52) U.S. Cl. ......... 358/474; 358/475; 358/448; 358/463
(58) Field of Classification Search .................. 358/474, 358/475, 448, 463, 482, 505
See application file for complete search history.

(56) References Cited

U.S. PATENT DOCUMENTS

| 6,091,451 | A | 7/2000 | Farr et al. | |
|---|---|---|---|---|
| 7,367,537 | B2 * | 5/2008 | Ibe | 248/266 |
| 2002/0123666 | A1 * | 9/2002 | Matsumoto | 600/178 |
| 2008/0117387 | A1 | 5/2008 | Hamano et al. | |

FOREIGN PATENT DOCUMENTS

| EP | 1 607 771 A1 | 12/2005 |
|---|---|---|
| EP | 1 720 050 A1 | 11/2006 |
| JP | 11-047084 * | 2/1999 |
| JP | 11-316405 | 11/1999 |
| JP | 2001-268583 | 9/2001 |
| JP | 2003-241090 | 8/2003 |
| JP | 2004-297132 | 10/2004 |
| JP | 2007-150826 | 6/2007 |
| JP | 2007-193194 | 8/2007 |
| JP | 2008-276185 | 11/2008 |
| WO | WO 2008/056531 A1 | 5/2008 |

OTHER PUBLICATIONS

European Search Report, Nov. 13, 2009.

* cited by examiner

*Primary Examiner* — Houshang Safaipour
(74) *Attorney, Agent, or Firm* — Dickstein Shapiro LLP

(57) ABSTRACT

An image processing unit generates image data of an image based on an output signal from an imaging device, corrects the image data, and outputs corrected image data. An optical filter is structured such that an upper limit of a transmitting wavelength decreases as a distance from an optical axis of the imaging optical system increases on an imaging plane of the imaging device so that a light in an infrared region is transmitted on the optical axis and cut off at a position farthest away from the optical axis on the imaging plane. The image processing unit corrects the image data based on a correction equation corresponding to the upper limit of the transmitting wavelength.

9 Claims, 12 Drawing Sheets

G-SIGNAL

R-SIGNAL

B-SIGNAL

| 0 | -0.5 | 0 | -0.5 | 0 |
|---|---|---|---|---|
| -0.5 | 0 | -1.0 | 0 | -0.5 |
| 0 | -1.0 | 9.0 | -1.0 | 0 |
| -0.5 | 0 | -1.0 | 0 | -0.5 |
| 0 | -0.5 | 0 | -0.5 | 0 |

LATERAL CHROMATIC ABERRATION CORRECTION

DISTORTION CORRECTION

IMAGING APPARATUS AND IMAGE CORRECTION METHOD

CROSS-REFERENCE TO RELATED APPLICATIONS

The present application claims priority to and incorporates by reference the entire contents of Japanese priority document 2008-132892 filed in Japan on May 21, 2008.

BACKGROUND OF THE INVENTION

1. Field of the Invention

The present invention relates to an imaging apparatus such as a camera, and more particularly, to a technology for correcting lateral chromatic aberration and distortion of an image.

2. Description of the Related Art

Recently, demands for acquiring a clear image of an object in a low-illuminance environment by an imaging apparatus, such as an in-vehicle back monitor, is growing. To fulfill this demand, an optical filter that can transmit light with a wavelength in the infrared region (infrared light) as well as light with a wavelength in the visible region (visible light) are actively developed. Such an optical filter is distinguished from an infrared cutoff filter that is typically used for reducing noise in the image of the object. A conventional optical filter is disclosed in, for example, Japanese Patent Application Laid-open No. 2007-150826 and Japanese Patent Application Laid-open No. H11-316405.

Specifically, the conventional optical filter allows infrared light to pass through a predetermined area of the optical filter towards an imaging plane of an imaging device without through an infrared cutoff filter, so that an image of an object in an area corresponding to the predetermined area can be formed on the imaging plane with increased light intensity. Therefore, a highly-clear image of the object can be obtained even in a low-illuminance environment.

Recently, demands for enabling a wide angle of view in the imaging apparatus are also increasing. Because lateral chromatic aberration in a captured image increases as the angle of view is widened, an optical system needs to be designed so that the lateral chromatic aberration can be prevented. However, designing of such an optical system leads to complicated processes, resulting in increasing costs.

SUMMARY OF THE INVENTION

It is an object of the present invention to at least partially solve the problems in the conventional technology.

According to one aspect of the present invention, there is provided an imaging apparatus including an imaging optical system that forms an image of an object on an imaging device; an image processing unit that generates image data based on an output signal from the imaging device, corrects the image data, and outputs corrected image data; and an optical filter arranged between the imaging optical system and the image processing unit. The optical filter is structured such that an upper limit of a transmitting wavelength decreases as a distance from an optical axis of the imaging optical system increases on an imaging plane of the imaging device so that a light in an infrared region is transmitted on the optical axis and cut off at a position farthest away from the optical axis on the imaging plane. The image processing unit corrects the image data based on a correction equation corresponding to the upper limit of the transmitting wavelength.

Furthermore, according to another aspect of the present invention, there is provided an imaging apparatus including an imaging optical system that forms an image of an object on an imaging device; an optical filter arranged between the imaging optical system and the imaging device; and an image processing unit that generates image data based on an output signal output from the imaging device. The optical filter is structured such that an upper limit of a transmitting wavelength decreases as a distance from an optical axis of the imaging optical system increases.

Moreover, according to still another aspect of the present invention, there is provided an imaging apparatus including an imaging optical system that forms an image of an object on an imaging device; an optical filter arranged between the imaging optical system and the imaging device; and an image processing unit that generates image data based on an output signal output from the imaging device. The optical filter is structured such that an upper limit of a transmitting wavelength gradually decreases as a distance from an optical axis of the imaging optical system increases.

Furthermore, according to still another aspect of the present invention, there is provided an image correction method for an imaging apparatus according to the present invention. The image correction method includes generating image data based on an output signal from the imaging device and correcting an aberration in the image data based on a correction equation corresponding to the upper limit of the transmitting wavelength.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
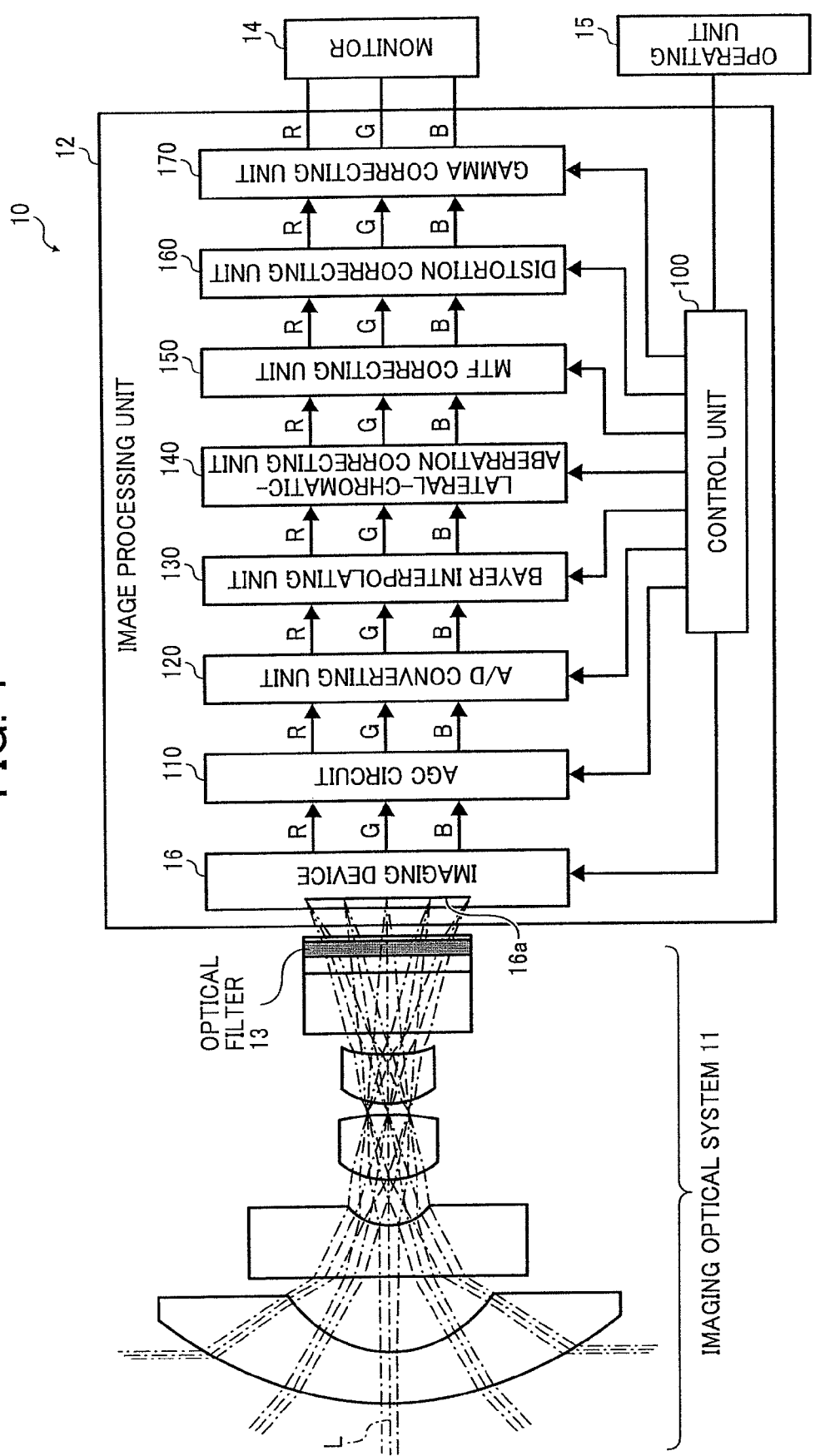
FIG. 1 is a schematic diagram of an imaging apparatus according to an embodiment of the present invention.

FIG. 1 is a schematic diagram of an imaging apparatus 10 according to an embodiment of the present invention. The imaging apparatus 10 includes, although not shown, mechanical units, such as a shutter-speed control unit or an aperture control unit, in addition to units shown in FIG. 1.

It is assumed that the imaging apparatus 10 is applied to an in-vehicle camera, so that an imaging optical system 11 is set to enable a wide field of view. However, the imaging apparatus 10 can be applied to other devices, and corresponding settings can be changed as appropriate. The imaging apparatus 10 includes the imaging optical system 11, an image processing unit 12, an optical filter 13, an image display unit (monitor) 14, and an operating unit 15.

The imaging optical system 11 is structured so that an image of an object (hereinafter, "an object image") is formed on an imaging plane 16a of an imaging device 16. Specifically, the imaging optical system 11 includes four circular lenses, one aperture, and a plate-like filter having a function of an optical low-pass filter. The imaging optical system 11 is structured to enable a super-wide field of view (an angle of view is over 90 degrees with respect to an optical axis L) as indicated by optical path lines shown in FIG. 1. By setting the imaging optical system 11 to enable the super-wide field of view, the imaging apparatus 10 can preferably be applied to a device (in the embodiment, an in-vehicle camera) used in a situation where an image of an object both in a front area (area in the optical axis direction of the imaging apparatus 10) and in wide areas on the right, left, top, and bottom of the front area needs to be captured.

The image processing unit 12 that includes the imaging device 16 further includes a control unit 100, an automatic gain control (AGC) circuit 110, an analog-to-digital (A/D) converting unit 120, a Bayer interpolating unit 130, a lateral-chromatic-aberration correcting unit 140, a modulation transfer function (MTF) correcting unit 150, a distortion correcting unit 160, and a gamma correcting unit 170. In the image processing unit 12, the control unit 100 sends necessary control signals to the other units to control operations of the other units in a pipeline manner. An image processing operation (an image processing process) performed by the image processing unit 12 will be described in detail later.

The imaging device 16 has sensitivity to light with a wavelength in the visible region (visible light) and light with a wavelength in the infrared region (infrared light). The imaging device 16 converts an object image formed on the imaging plane 16a by the imaging optical system 11 into electrical signals (pixel data), and outputs the pixel data. The imaging device 16 can be a charge coupled device (CCD) sensor, a complementary metal-oxide-semiconductor (CMOS) sensor, or the like. The imaging device 16 includes, although not shown, a color filter having Bayer color filter array (see FIG. 9A), so that the electrical signals (pixel data) to be output correspond to RGB pixel data in Bayer pattern (hereinafter, "Bayer RGB pixel data"). The optical filter 13 is arranged between the imaging device 16 and the imaging optical system 11.

Figure 2A:
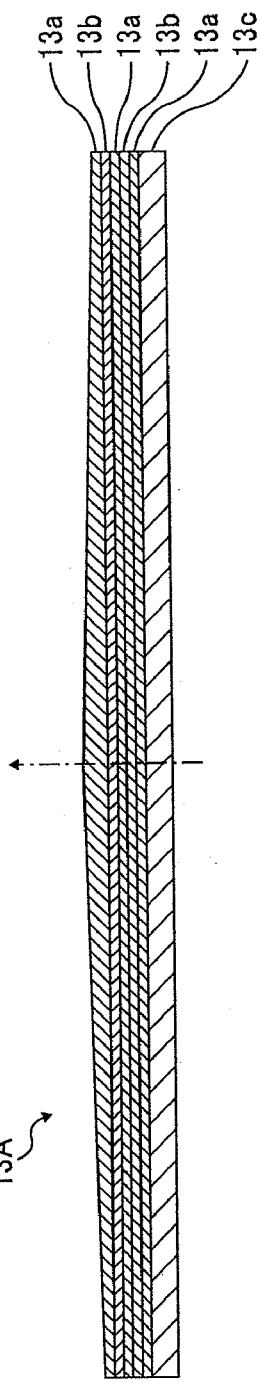
FIG. 2A is a schematic diagram of an optical filter whose thickness is changed in a continuous manner.
Figure 2B:
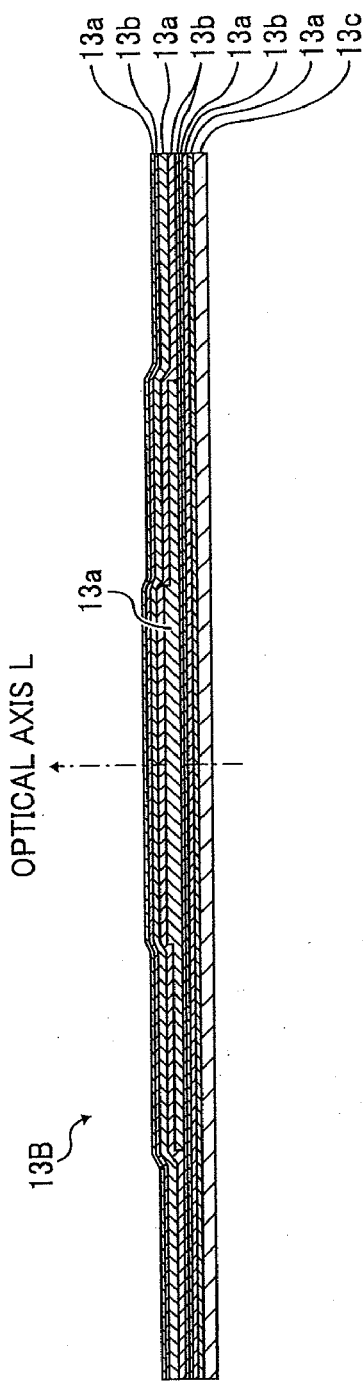
FIG. 2B is a schematic diagram of an optical filter whose thickness is changed in a stepwise manner.
Figure 2C:
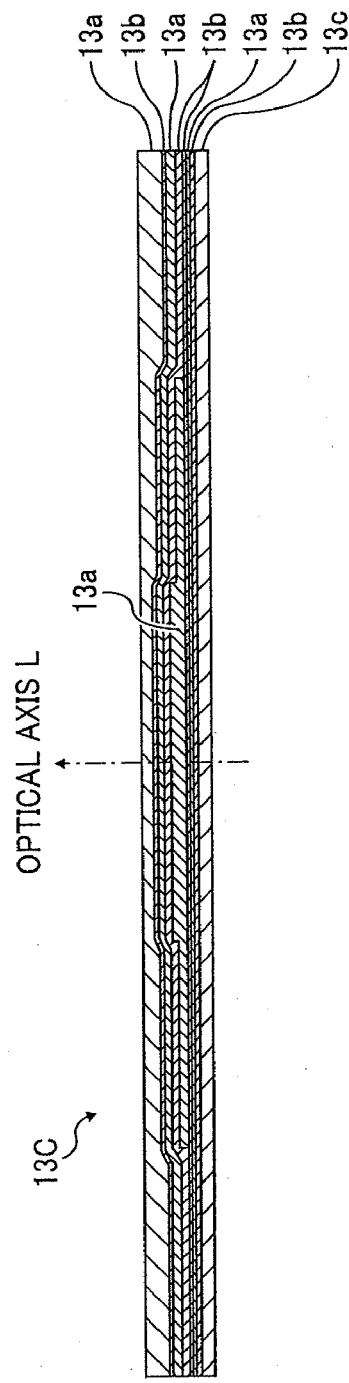
FIG. 2C is a schematic diagram of an optical filter whose thickness is made uniform with the same structure as that of the optical fiber shown in FIG. 2B.
Figure 3:
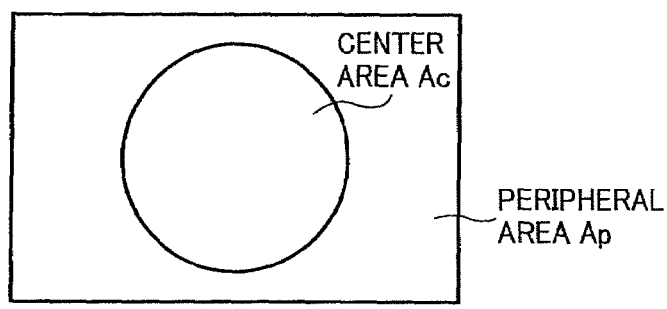
FIG. 3 is a front view of an optical filter according to the embodiment.
Figure 4:
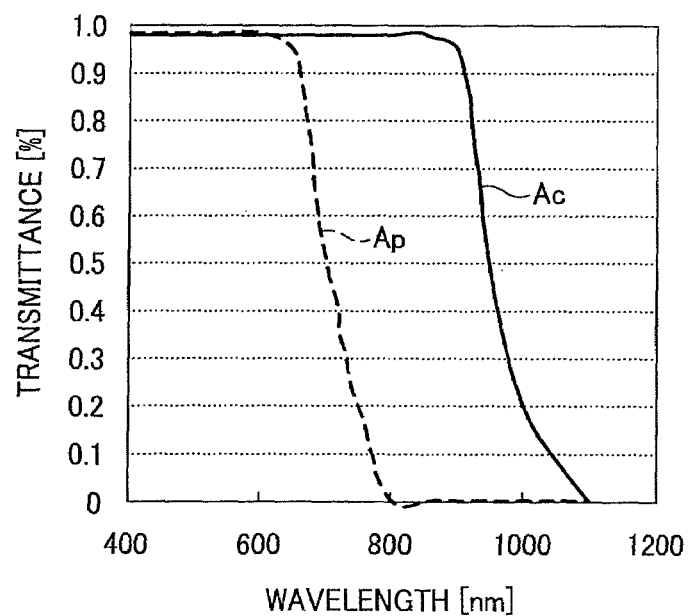
FIG. 4 is a graph of transmittance versus wavelength of the optical filter shown in FIG. 3.
Figure 5:
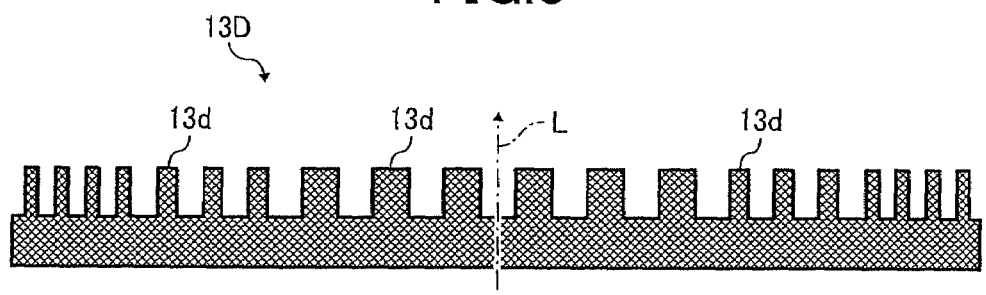
FIG. 5 is a schematic diagram of an optical filter with a structure different from those of the optical filters shown in FIGS. 2A to 2C.

FIGS. 2A to 2C are schematic diagrams for explaining exemplary structures of the optical filter 13. FIG. 2A illustrates an optical filter 13A whose thickness is changed in a continuous manner. FIG. 2B illustrates an optical filter 13B whose thickness is changed in a stepwise manner. FIG. 2C illustrates an optical filter 13C whose thickness is made uniform with the same structure as the optical filter 13B. FIG. 3 is a front view of the optical filter 13. FIG. 4 is a graph of transmittance versus wavelength of the optical filter 13. FIG. 5 is a schematic diagram of an optical filter 13D having another applicable structure.

As shown in FIGS. 2A to 2C, each of the optical filters 13A, 13B, and 13C has a dielectric multilayer structure with a basic structure of air/(L/2HL/2)p/substrate, where L is a $\lambda/4$ thickness of a low-refractive-index layer 13a, H is a $\lambda/4$ thickness of a high-refractive-index layer 13b, and $p$ is a period of repeating layers. In such a dielectric multilayer structure, transmission characteristics can be adjusted by changing a thickness, and sharp cutoff characteristics (rate of change in transmittance with respect to change in wavelength) can be obtained by increasing the period p. With this structure, because ripple (gain change) increases as the period p increases, it is applicable to additionally form a matching layer to prevent ripple.

The optical filter 13 is structured so that an upper limit of a transmitting wavelength decreases as a distance from the optical axis L increases. Specifically, the optical filter 13 transmits the infrared light at the optical axis L (in the center area) and blocks the same light at a position that is most distant from the optical axis L. The optical filter 13 can be structured as the optical filter 13A as shown in FIG. 2A, in which alternating layers of the low-refractive-index layer 13a and the high-refractive-index layer 13b are laminated on a substrate 13c such that the thicknesses of the low-refractive-index layers 13a and the high-refractive-index layers 13b are changed in a continuous manner so that the center area (at the optical axis L) can be made thickest. Furthermore, the optical filter 13 can be structured as the optical filter 13B as shown in FIG. 2B, in which the thicknesses of the low-refractive-index layers 13a and the high-refractive-index layers 13b are changed in a stepwise manner. Moreover, the optical filter 13 can be structured as the optical filter 13C as shown in FIG. 2C, in which the thicknesses of the low-refractive-index layers 13a and the high-refractive-index layers 13b are changed in a stepwise manner while the surface of the topmost layer (a layer exposed to air) is made flat.

As shown in FIG. 3, the optical filter 13 has a center area Ac and a peripheral area Ap in a concentric manner with respect to the optical axis L. The upper limit of the transmitting wavelength is set differently for each of the center area Ac and the peripheral area Ap. The center area Ac corresponds to an area within the angle of view (incidence angle) of 45 degrees on the imaging plane 16a in the imaging optical system 11. As shown in FIG. 4, the center area Ac is structured so that the transmittance of light with a wavelength in the visible region (400 nanometers to 780 nanometers in FIG. 4) becomes substantially 100 percent while the transmittance of light with a wavelength of about 900 nanometers or longer is gradually decreased until zero such that the transmittance of light with a wavelength of about 950 nanometers becomes substantially 50%. Likewise, the peripheral area Ap is structured so that the transmittance of light with a wavelength of 400 nanometers or longer becomes substantially 100 percent while the transmittance of light with a wavelength of about 600 nanometers or longer is gradually decreased until zero such that the transmittance of light with a wavelength of about 700 nanometers becomes substantially 50%. In the embodiment, the wavelength at which the transmittance becomes substantially 50 percent is considered as a cutoff wavelength. Furthermore, the cutoff wavelength is considered as the upper limit of the transmitting wavelength. That is, in the center area Ac, the upper limit of the transmitting wavelength is set to about 950 nanometers, and, in the peripheral area Ap, the upper limit of the transmitting wavelength is set to about 700 nanometers.

The optical filter 13 can have a structure as shown in FIG. 5 (the optical filter 13D), in addition to the structures as shown in FIGS. 2A to 2C. The optical filter 13D has a subwavelength structure (a concave-convex structure) containing a structural object having a size smaller than a light wavelength. The light wavelength in this case corresponds to a light wavelength that can pass through the optical filter 13D. In the optical filter 13D, a pitch of a convex portion 13d, a height of the convex portion 13d, and a duty ratio of the convex portion 13d per period in the subwavelength structure are changed depending on a distance (an area) from the optical axis L so that cutoff wavelength characteristics can be changed in accordance with the distance from the optical axis L. Specifically, the optical filter 13D is structured so that the upper limit of the transmitting wavelength decreases as the distance from the optical axis L increases. With this structure, the optical filter 13D can enable various cutoff wavelength characteristics by using only a single substrate.

Figure 6:
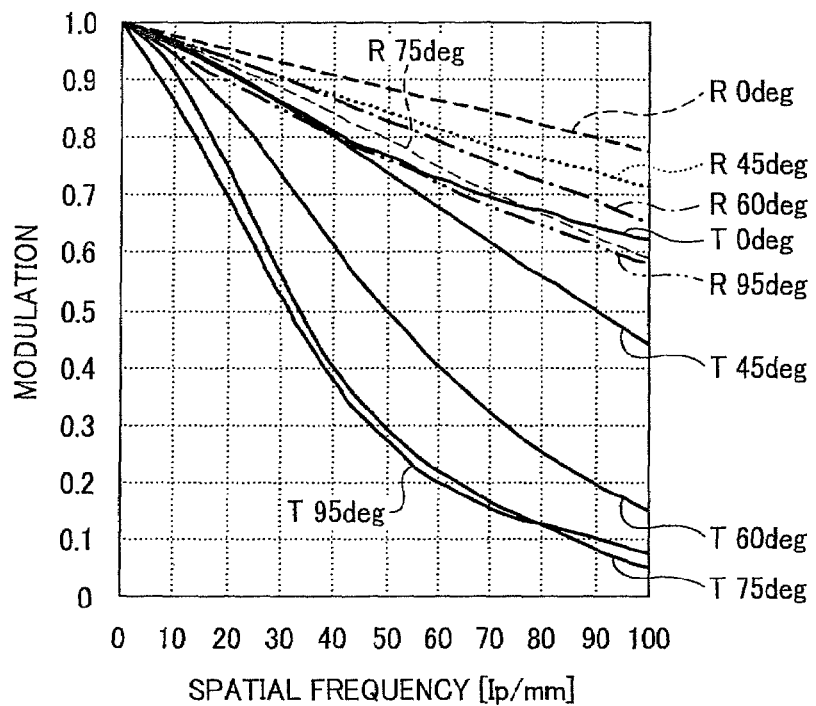
FIG. 6 is a graph illustrating characteristics of an imaged spot on an imaging device when an optical filter having a cutoff wavelength of 700 nanometers is used, with spatial frequency on the horizontal axis and modulation transfer function (MTF) on the vertical axis.
Figure 7:
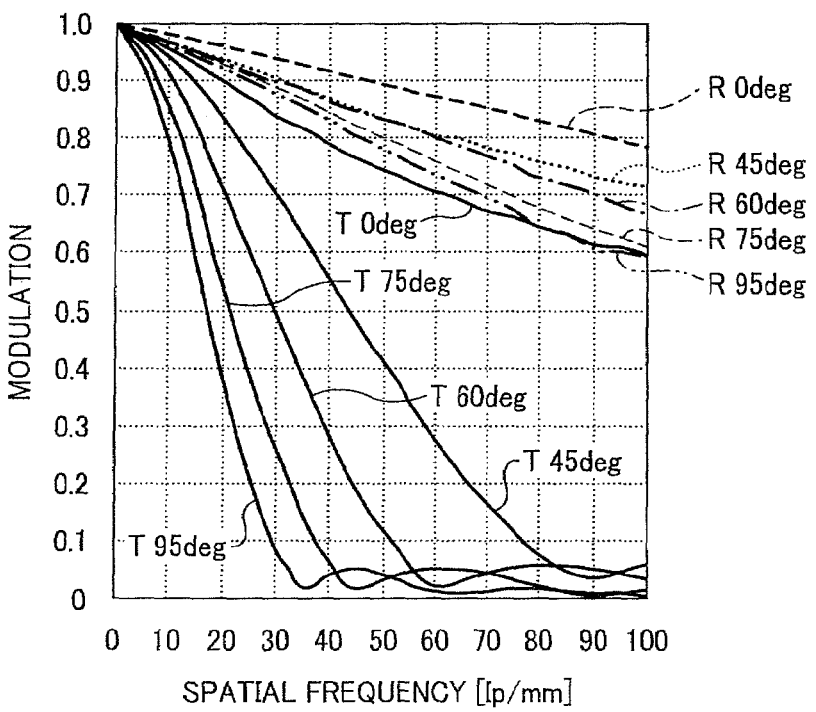
FIG. 7 is a graph illustrating characteristics of an imaged spot on an imaging device when an optical filter having a cutoff wavelength of 900 nanometers is used, with spatial frequency on the horizontal axis and MTF on the vertical axis.
Figure 8:
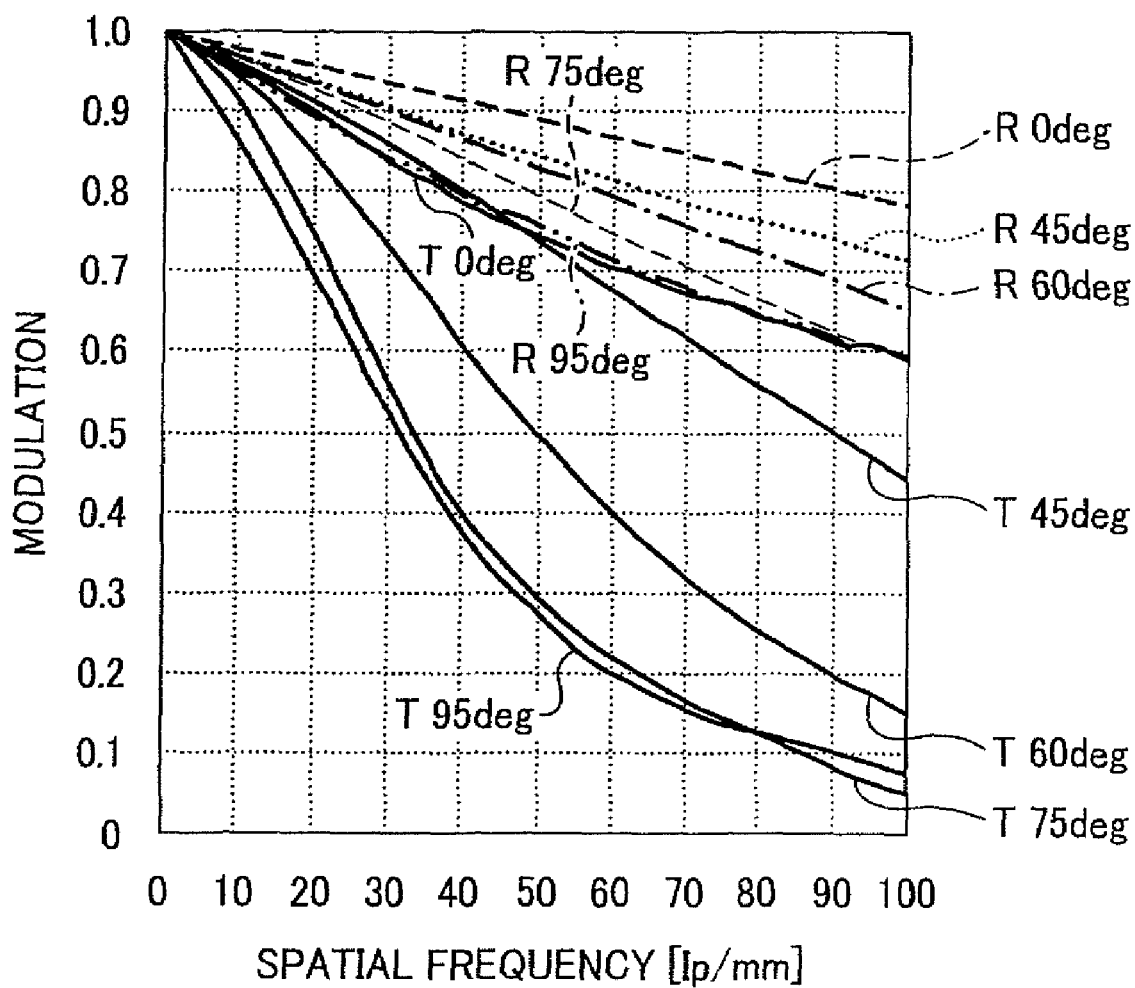
FIG. 8 is a graph illustrating characteristics of an imaged spot on an imaging device when an optical filter according to the embodiment is used, with spatial frequency on the horizontal axis and MTF on the vertical axis.

The effect of the optical filter 13 in the imaging apparatus 10 is described below. FIGS. 6 to 8 are graphs illustrating characteristics of an imaged spot (hereinafter, "spot characteristics") on the imaging device 16, with spatial frequency on the horizontal axis and MTF on the vertical axis. In the graphs, characteristic lines are plotted, which are obtained when light incidence angles with respect to an object (tilt with respect to the optical axis L) are set to 0 degree, 45 degrees, 60 degrees, 75 degrees, and 95 degrees, respectively. The characteristic lines indicated by "R" in FIGS. 6 to 8 represent the spot characteristics in a radial direction (in a radiation direction) at the corresponding incidence angles. On the other hand, the characteristic lines indicated by "T" in FIGS. 6 to 8 represent the spot characteristics in a tangential direction (in a concentric direction) at the corresponding incidence angles.

More particularly, the graph shown in FIG. 6 illustrates the spot characteristics when an optical filter having a cutoff wavelength of 700 nanometers (hereinafter, "an optical filter of 700 nanometers") is used. The graph shown in FIG. 7 illustrates the spot characteristics when an optical filter having a cutoff wavelength of 900 nanometers (hereinafter, "an optical filter of 900 nanometers") is used. The graph shown in FIG. 8 illustrates the spot characteristics when the optical filter 13 is used.

As shown in FIG. 6, when the optical filter of 700 nanometers is used, sufficient resolution can be obtained with the spatial frequency of 100 lp/mm regardless of the light incidence angle. However, with the optical filter of 700 nanometers, the intensity of infrared light cannot be used, so that a chart image captured in a low-illuminance environment is blacked out.

As shown in FIG. 7, when the optical filter of 950 nanometers is used, sufficient resolution is obtained only with light at the incidence angle of 45 degrees or smaller, that is, light around the optical axis L. The reason for this is as follows. Because the lateral chromatic aberration occurs due to wavelength difference, the effect of the lateral chromatic aberration is increased by the optical filter of 950 nanometers than by the optical filter of 700 nanometers, and because the imaging optical system 11 is structured to enable a wide field of view, the effect is further intensified in the area distant from the optical axis L. However, with the optical filter of 950 nanometers, the intensity of infrared light can be used, so that an image can be captured clearly even in a low-illuminance environment.

The optical filter 13 in the imaging apparatus 10 is structured such that the optical filter of 700 nanometers and the optical filter of 950 nanometers are combined in accordance with the optical characteristics of the imaging optical system 11. Specifically, the imaging optical system 11 has such characteristics that the effect of the lateral chromatic aberration is small in the area around the optical axis L, so that sufficient resolution can be assured in a captured image (see the characteristic line at 0 degree in FIG. 7) even when the area around the optical axis L, that is, the center area Ac, is structured to have the cutoff wavelength of 950 nanometers. Thus, in the optical filter 13, the center area Ac is structured to have the cutoff wavelength of 950 nanometers while an image can be captured clearly in the center area Ac even in a low-illuminance environment. Furthermore, the optical filter 13 has such characteristics that the effect of the lateral chromatic aberration increases as the distance from the optical axis L increases, so that the effect of the lateral chromatic aberration in a captured image can be reduced (see the characteristic lines at 45 degrees to 95 degrees in FIG. 8) by structuring the area distant from the optical axis L, that is, the peripheral area Ap, to have the cutoff wavelength of 700 nanometers.

In the optical filter 13 structured as described above, the spot characteristics similar to that of the optical filter of 700 nanometers as shown in FIG. 8 can be obtained. Therefore, the sufficient resolution can be obtained with the spatial frequency of 100 lp/mm regardless of the light incidence angle. Furthermore, with the optical filter 13, the intensity of infrared light can be used in the center area Ac. Therefore, the center area of an image can be captured clearly.

The image processing process performed by the image processing unit 12 in the imaging apparatus 10 is described in detail below with reference to FIG. 1.

As described above, the image processing unit 12 is controlled by the control unit 100 that outputs necessary signals to the other units in a pipeline manner. The control unit 100 controls the image processing unit 12 and the mechanical units based on an operation performed via the operating unit 15. The imaging device 16 converts an object image formed by the imaging optical system 11 into electrical signals (the Bayer RGB pixel data) and then outputs the electrical signals. At this time, the imaging device 16 sequentially outputs each piece of the Bayer RGB pixel data based on coordinate data (x, y) notified by the control unit 100. The control unit 100 sequentially sends the coordinate data (x, y), which is to be notified to the imaging device 16, to subsequent stages at a predetermined time interval.

The AGC circuit 110 amplifies an analog image signal received from the imaging device 16 to a predetermined level, and sends the amplified signal to the A/D converting unit 120. The amount of gain to be adjusted by the AGC circuit 110 is set to an appropriate value in consideration of a balance between required brightness of a screen and noise that are traded off against each other. Because the imaging apparatus 10 has the optical filter 13 that allows the infrared light to pass through the area around the optical axis L, the amount of gain to be raised with low illuminance can be reduced. Therefore, high-quality images with reduced noise can be obtained.

The A/D converting unit 120 converts the analog signal of each piece of the Bayer RGB pixel data amplified by the AGC circuit 110 into a digital signal, and sends the digital signal to the Bayer interpolating unit 130. In the embodiment, it is assumed that the digital signal of each piece of the Bayer RGB pixel data is 8-bit based.

Figure 9A:
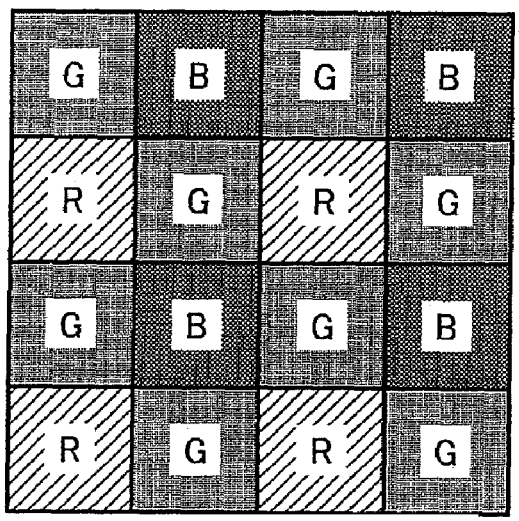
FIG. 9A is a schematic diagram of Bayer color filter array used for Bayer interpolation.
Figure 9B:
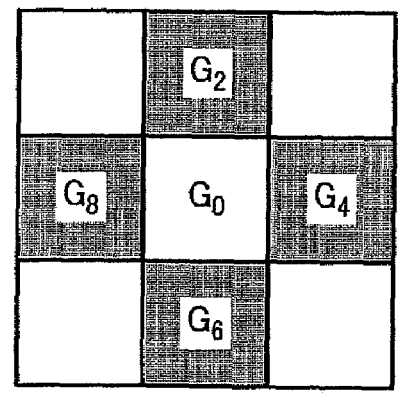
FIG. 9B is a schematic diagram of a resulting pattern of G-color component pixel data by Bayer interpolation.
Figure 9C:
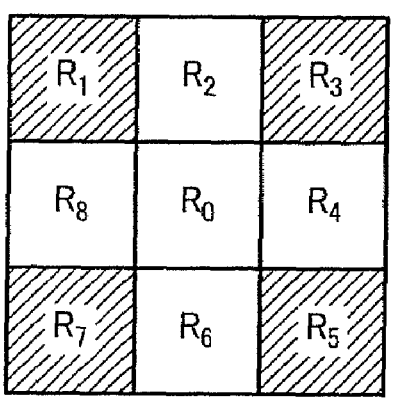
FIG. 9C is a schematic diagram of a resulting pattern of R-color component pixel data by Bayer interpolation.
Figure 9D:
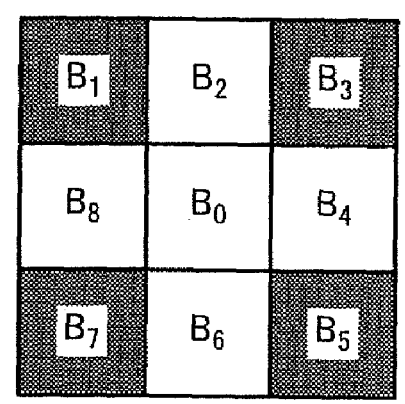
FIG. 9D is a schematic diagram of a resulting pattern of B-color component pixel data by Bayer interpolation.

Upon receiving the digital signal of each piece of the Bayer RGB pixel data, the Bayer interpolating unit 130 generates color-component pixel data at all coordinate positions with respect to each of RGB color components by liner interpolation based on the received Bayer RGB pixel data. Hereinafter, the color-component pixel data generated by Bayer interpolation is referred to as "Bayer-interpolated RGB pixel data". Then, the Bayer interpolating unit 130 sends the Bayer-interpolated RGB pixel data to the lateral-chromatic-aberration correcting unit 140. Bayer interpolation is performed in the following manner. FIGS. 9A to 9D are schematic diagrams for explaining Bayer interpolation. More particularly, FIG. 9A is a schematic diagram of Bayer color filter array, FIG. 9B is a schematic diagram of a resulting pattern of G-color component pixel data by Bayer interpolation, FIG. 9C is a schematic diagram of a resulting pattern of R-color component pixel data by Bayer interpolation, and FIG. 9D is a schematic diagram of a resulting pattern of B-color component pixel data by Bayer interpolation.

An area $G_0$ in FIG. 9B corresponds to an area indicated by either R or B in FIG. 9A. The area $G_0$ is obtained by $$G_0=(G_2+G_4+G_6+G_8)/4 \quad (1)$$

Similarly, areas $R_2$, $R_4$, $R_6$, $R_8$, and $R_0$ in FIG. 9C correspond to areas indicated by either G or B in FIG. 9A. The areas $R_2$, $R_4$, $R_6$, $R_8$, and $R_0$ are obtained respectively by $$R_2=(R_1+R_3)/2 \quad (2)$$

$$R_4=(R_3+R_5)/2 \quad (3)$$

$$R_6=(R_5+R_7)/2 \quad (4)$$

$$R_8=(R_1+R_7)/2 \quad (5)$$

$$R_0=(R_1+R_3+R_5+R_7)/2 \quad (6)$$

Furthermore, areas $B_2$, $B_4$, $B_6$, $B_8$, and $B_0$ in FIG. 9D correspond to areas indicated by either G or R in FIG. 9A. The areas $B_2$, $B_4$, $B_6$, $B_8$, and $B_0$ can be obtained in the same manner as the areas $R_2$, $R_4$, $R_6$, $R_8$, and $R_0$ (Equations (2) to (6)), and therefore, detailed explanation is omitted.

Upon receiving the Bayer-interpolated RGB pixel data, the lateral-chromatic-aberration correcting unit 140 performs coordinate transformation (coordinate transformation for lateral chromatic aberration) on the Bayer-interpolated RGB pixel data with respect to each of the RGB color components by using a predetermined polynomial. Then, the lateral-chromatic-aberration correcting unit 140 sends RGB pixel data on which the lateral chromatic aberration has been corrected through the coordinate transformation (hereinafter, "chromatic-aberration-corrected RGB pixel data") to the MTF correcting unit 150. Details about the lateral-chromatic-aberration correcting unit 140 will be given later with explanation about the distortion correcting unit 160. When performing the coordinate transformation for lateral chromatic aberration, either a memory with low capacity and low latency or a memory with low capacity and multiple ports (e.g., static random access memory (SRAM)) is used.

Upon receiving the chromatic-aberration-corrected RGB pixel data, the MTF correcting unit 150 performs an MTF correction process on the chromatic-aberration-corrected RGB pixel data by using a finite impulse response (FIR) filter 154. Then, the MTF correcting unit 150 outputs RGB pixel data on which the MTF correction has been performed (hereinafter, "MTF-corrected RGB pixel data"). The MTF correction process is performed as follows.

Figures 10, 11:
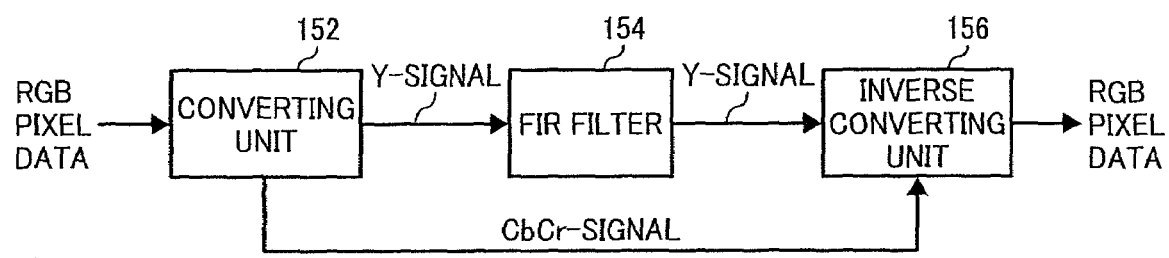
FIG. 10 is a schematic diagram of an MTF correcting unit shown in FIG. 1.
FIG. 11 is a schematic diagram for explaining coefficients of a finite impulse response (FIR) filter shown in FIG. 10.

FIG. 10 is a schematic diagram of the MTF correcting unit 150. FIG. 11 is a schematic diagram for explaining coefficients of the FIR filter 154. The MTF correcting unit 150 includes a converting unit 152, the FIR filter 154, and an inverse converting unit 156.

The converting unit 152 converts received RGB pixel data into YCbCr pixel data. This conversion is performed by using Equations (7) to (9).

$$Y=0.299R+0.587G+0.114B \quad (7)$$

$$Cr=0.500R-0.419G-0.081B \quad (8)$$

$$Cb=-0.169R-0.332G+0.500B \quad (9)$$

The converting unit 152 sends a luminance signal Y of the YCbCr pixel data to the FIR filter 154, and sends a color-difference signal CbCr of the YCbCr pixel data to the inverse converting unit 156.

The FIR filter 154 performs a predetermined MTF correction process on the input luminance signal Y, and sends the luminance signal Y on which the MTF correction is performed (hereinafter, "MTF-corrected luminance signal Y") to the inverse converting unit 156. Because the FIR filter 154 (the MTF correcting unit 150) performs filtering (MTF correction) only on the luminance signal Y, it is possible to obtain high-quality images in which color noise is not amplified. In the embodiment, it is assumed that the FIR filter 154 is structured as a 5×5 filter, and coefficients such as coefficients as shown in FIG. 11 are set in the FIR filter 154.

The inverse converting unit 156 performs inverse conversion on the MTF-corrected luminance signal Y received from the FIR filter 154 and on the color-difference signal CbCr that is corresponding to the MTF-corrected luminance signal Y among the color-difference signal CbCr received from the converting unit 152, so that inversely-converted RGB pixel data can be obtained. The inverse conversion is performed by using Equations (10) to (12).

$$R=Y+1.402Cr \quad (10)$$

$$G=Y-0.714Cr-0.344Cb \quad (11)$$

$$B=Y+1.772Cb \quad (12)$$

The inverse converting unit 156 sends the inversely-converted RGB pixel data to the distortion correcting unit 160.

In a typical optical system, a focus spot on an imaging device degrades as a distance of the focus spot from an optical axis increases, resulting in degrading quality of a captured image (see FIGS. 6 and 7). Considering this fact, if the FIR filter can be set differently depending on the distance from the optical axis (different coefficients are set), high-quality images can be captured effectively. According to the embodiment, because the imaging apparatus 10 has the optical filter 13 structured so that different cutoff wavelength characteristics can be obtained depending on the distance from the optical axis (the center area Ac and the peripheral area Ap), it is possible to prevent degradation in resolving power in an area corresponding to the peripheral area Ap in a captured image (see FIG. 8). Therefore, even when the single FIR filter 154 (or a single coefficient) is used, the imaging apparatus 10 can enhance the effect of the MTF correction.

The distortion correcting unit 160 performs a distortion correction on the MTF-corrected RGB pixel data, on which the lateral chromatic aberration correction has been performed and then the MTF correction has been performed, by performing coordinate transformation (distortion coordinate transformation) collectively for all the RGB color components by using a predetermined polynomial. Then, the distortion correcting unit 160 sends RGB pixel data on which the distortion correction has been performed (hereinafter, "distortion-corrected RGB pixel data") to the gamma correcting unit 170. When the distortion correcting unit 160 performs the coordinate transformation, a memory having a larger capacity (corresponding to one screen at a maximum) than that of the memory used for lateral chromatic aberration correction but having only a single port is necessary. Therefore, a memory with high latency (for example, a dynamic random access memory (DRAM)) can be used. Details about the distortion correcting unit 160 will be described later.

The gamma correcting unit 170 performs a predetermined gamma correction on the distortion-corrected RGB pixel data depending on characteristics of the monitor 14 by using a lookup table or the like provided for each of the RGB color components. Then, the gamma correcting unit 170 sends RGB pixel data on which the gamma correction has been performed to the monitor 14.

In this manner, the image processing unit 12 performs the image processing process. Detailed explanation about the lateral-chromatic-aberration correcting unit 140 and the distortion correcting unit 160 are now given in the following description.

Figure 12:
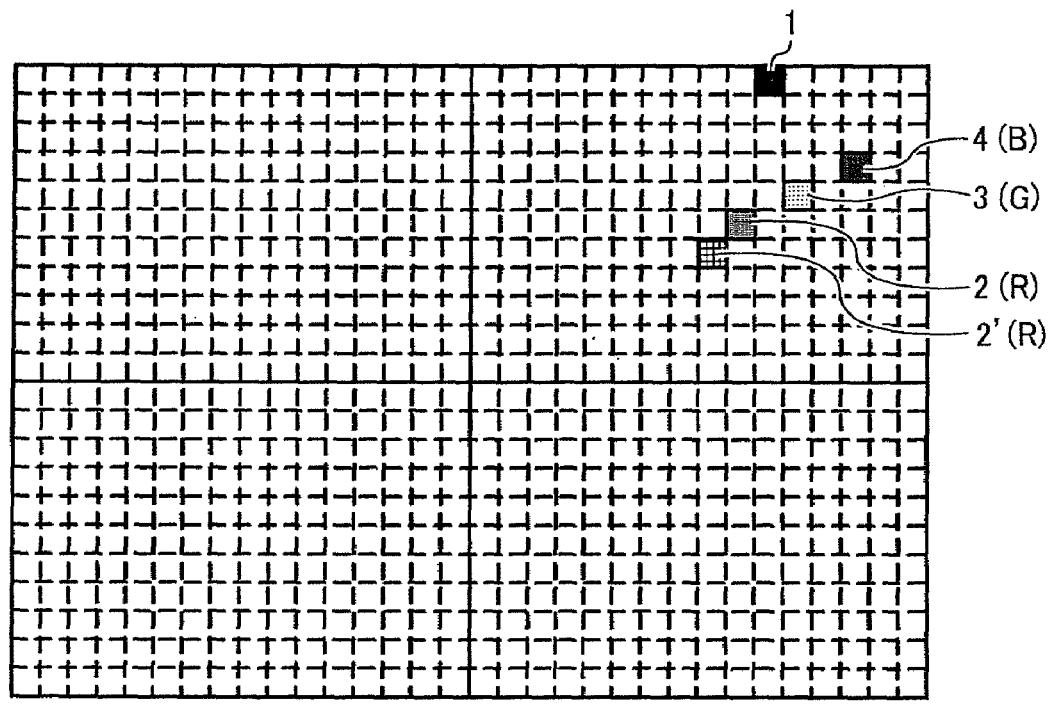
FIG. 12 is a schematic diagram for explaining lateral chromatic aberration and distortion on a screen displayed on an image display unit (on an imaging plane of an imaging device)
Figure 13:
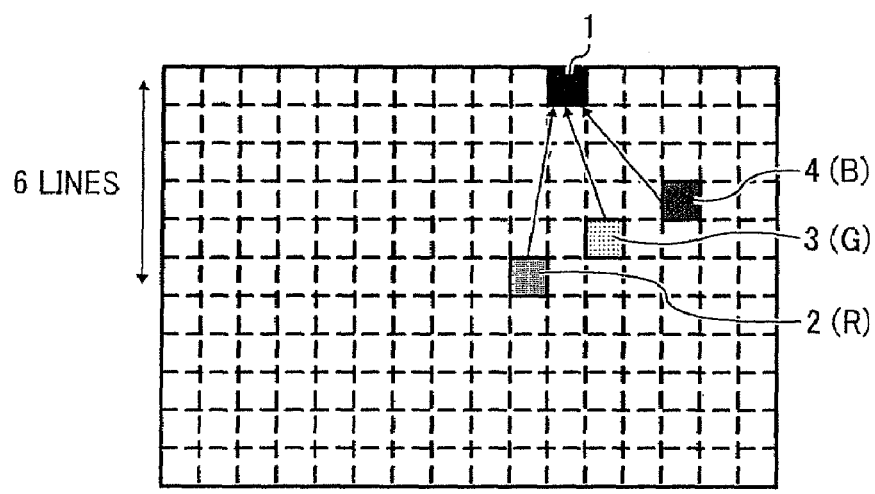
FIG. 13 is a schematic diagram for explaining a conventional method of correcting lateral chromatic aberration and distortion.
Figure 14A:
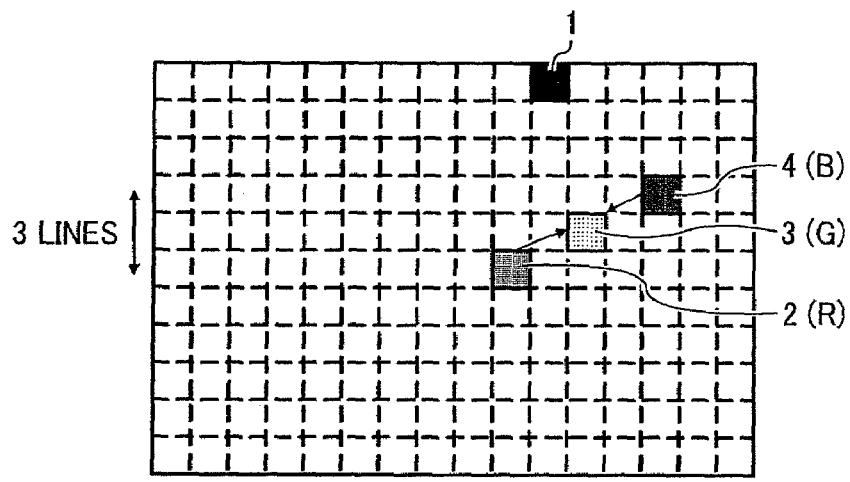
FIG. 14A is a schematic diagram for explaining a method of correcting lateral chromatic aberration according to the embodiment.
Figure 14B:
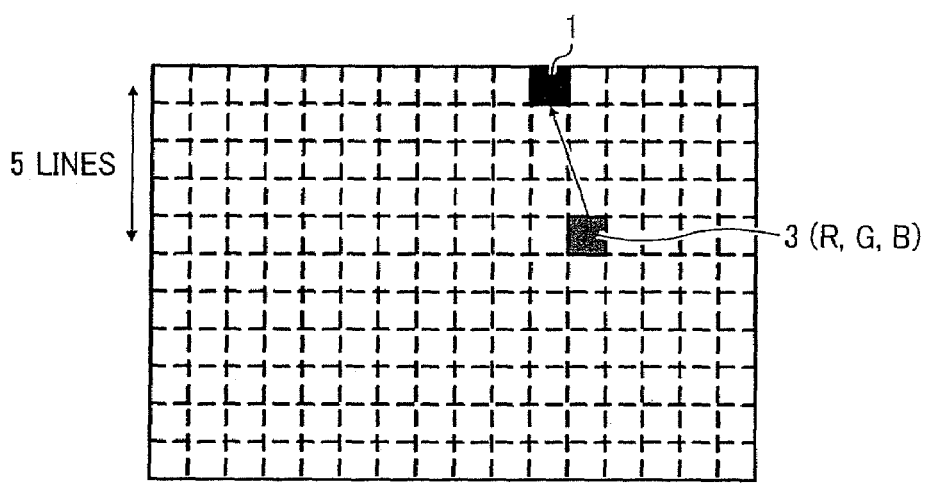
FIG. 14B is a schematic diagram for explaining a method of correcting distortion according to the embodiment.

Basic techniques of the lateral chromatic aberration correction and the distortion correction according to the embodiment are described below. FIG. 12 is a schematic diagram for explaining lateral chromatic aberration and distortion on a screen displayed on the monitor 14 (the imaging plane 16a of the imaging device 16). FIG. 13 is a schematic diagram for explaining a conventional method of correcting the lateral chromatic aberration and the distortion. FIG. 14A is a schematic diagram for explaining a method of correcting the lateral chromatic aberration by the imaging apparatus 10. FIG. 14B is a schematic diagram for explaining a method of correcting the distortion by the imaging apparatus 10.

It is assumed that, as shown in FIG. 12, pixel data is formed at a position (pixel) 1 on the upper right portion in the screen when an image is captured by using an optical system that does not cause lateral chromatic aberration and distortion. When the same image is captured by an optical system that causes lateral chromatic aberration and distortion, the pixel data at the position 1 on the upper right portion in the screen shifts to positions (pixels) 2(R), 3(G), and 4(B) with respect to each of RGB color components. Such positional shift occurs because of the distortion, and the amount of shift varies for each of the RGB color components because of the lateral chromatic aberration.

The amount of the distortion and the amount of the lateral chromatic aberration can be determined based on design data of the optical system, so that it is possible to calculate positions to which the RGB color components shift, respectively, from the original position. In the conventional technology, as shown in FIG. 13, R-color component pixel data at the position 2(R), G-color component pixel data at the position 3(G), and B-color component pixel data at the position 4(B) are copied to the position 1 that is the original position. Thus, coordinate transformation is performed so that the lateral chromatic aberration and the distortion can be corrected simultaneously.

However, in the conventional technology, it is necessary to mount either a memory with high capacity and low latency or a memory with high capacity and multiple ports with respect to each of the RGB color components. For example, in the example shown in FIG. 13, high-speed memory for 6 lines needs to be mounted for each of the RGB color components to perform the coordinate transformation.

On the other hand, the imaging apparatus 10 corrects the lateral chromatic aberration and the distortion separately as described above. This is because the lateral chromatic aberration occurs such that the amount of shift varies depending on the color components (wavelength difference) while the amount of shift is small, and the distortion occurs such that the amount of shift is large while a shift direction and the amount of shift are the same between the color components. Specifically, the imaging apparatus 10 performs coordinate transformation individually on pixel data of each of the RGB color components to correct the lateral chromatic aberration, and then performs coordinate transformation collectively on the pixel data of each of the RGB color components after the lateral chromatic aberration has been corrected. Accordingly, a memory used for performing the coordinate transformation by the image processing unit 12 can be separated into a memory used for correcting the lateral chromatic aberration (a first coordinate transformation memory) and a memory used for correcting the distortion (a second coordinate transformation memory) in the following manner. That is, the first coordinate transformation memory is structured as a low-capacity high-speed (low-latency or multi-port) memory so that it can be used individually for each of the RGB color components. The second coordinate transformation memory is structured as a high-capacity low-speed (high-latency or single-port) memory so that it can be used in common to all the RGB color components. As a result, overall costs can be reduced.

More particularly, as shown in FIG. 14A, the lateral-chromatic-aberration correcting unit 140 copies the R-color component pixel data at the position 2(R), the B-color component pixel data at the position 4(B), and the G-color component pixel data at the position 3(G) among pieces of RGB pixel data sent by the Bayer interpolating unit 130 to the position 3(G). In other words, the lateral-chromatic-aberration correcting unit 140 does not perform the coordinate transformation on the G-color component pixel data. As a result, the chromatic-aberration corrected RGB pixel data is generated.

As shown in FIG. 14B, the distortion correcting unit 160 performs the coordinate transformation collectively on all pieces of the chromatic-aberration corrected RGB pixel data at the position 3(G) so that they are copied to the position 1 that is the original position. As a result, the distortion is corrected.

As described earlier, the distortion correcting unit 160 performs the distortion correction on the MTF-corrected RGB pixel data that is obtained after the lateral-chromatic-aberration correcting unit 140 performs the lateral chromatic aberration correction and then the MTF correcting unit 150 performs the MTF correction. Because the MTF correction is not performed through the coordinate transformation unlike the lateral chromatic aberration correction and the distortion correction, even when the distortion correction is performed on the MTF-corrected RGB pixel data, adverse effects can hardly occur while desired effects can be assured as follows. Because the MTF correcting unit 150 performs the MTF correction by performing filtering only on the luminance signal Y, the MTF correction (by the MTF correcting unit 150) needs to be performed after the lateral chromatic aberration correction (by the lateral-chromatic-aberration correcting unit 140). From this view point, it seems applicable to perform the MTF correction after the distortion correction (by the distortion correcting unit 160). However, as described above, a transformation distance by the coordinate transformation for the distortion correction is long, so that calculation error may sometimes occur. By performing the MTF correction after the lateral chromatic aberration correction and before the distortion correction, it is possible to prevent a situation where quality of images is degraded because the error due to the distortion correction is increased by performing the MTF correction. Therefore, high-quality captured images can be assuredly obtained.

In the example shown in FIG. 14A, a high-speed memory for only 3 lines is sufficient for each of the RGB color components to perform the lateral chromatic aberration correction. Furthermore, in the example shown in FIG. 14B, a memory for 5 lines is necessary but the memory can be commonly used for all the RGB color components and the memory can be a low-speed memory. Therefore, overall costs can be reduced compared with the conventional method shown in FIG. 13.

The distortion described in the embodiment indicates distortion of a lens with respect to a desired projection type. The projection type can be one in which a looked-down image viewed from the top portion of a camera is obtained, or in which an enlarged view of a specific portion is displayed.

Figure 15:
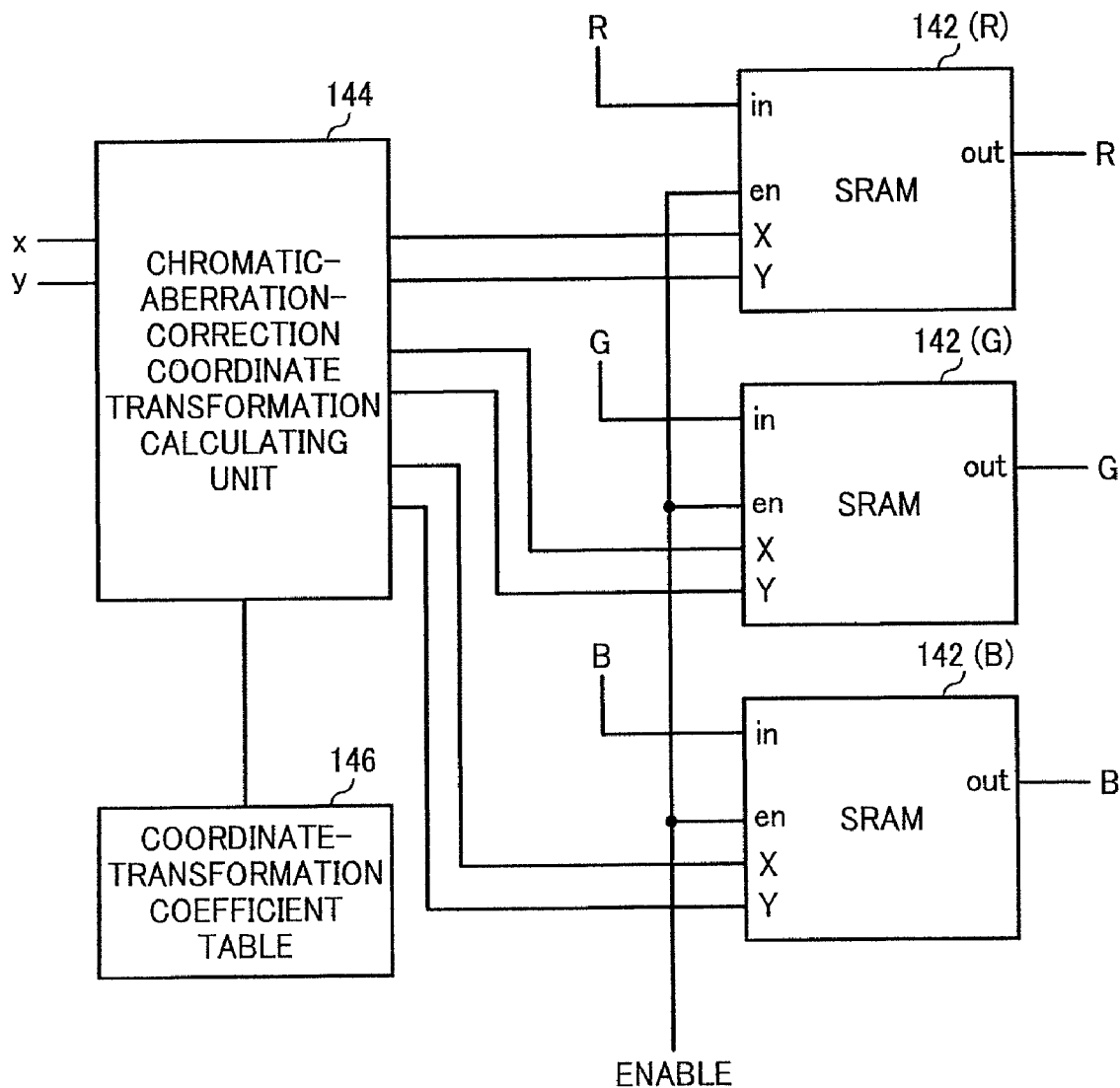
FIG. 15 is a schematic diagram of a lateral-chromatic-aberration correcting unit shown in FIG. 1.

The configuration of the lateral-chromatic-aberration correcting unit 140 is described below. FIG. 15 is a schematic diagram of the lateral-chromatic-aberration correcting unit 140.

The lateral-chromatic-aberration correcting unit 140 includes a chromatic-aberration-correction coordinate transformation memory 142 (hereinafter, "the coordinate transformation memory 142") ("SRAM" in FIG. 15), a chromatic-aberration-correction coordinate transformation calculating unit 144 (hereinafter, "the calculating unit 144"), and a coordinate-transformation coefficient table 146.

The coordinate transformation memory 142 is a line buffer and mounted for each of the RGB color components. Hereinafter, the coordinate transformation memory 142 for the R-color component is referred to as a coordinate transformation memory 142(R), the coordinate transformation memory 142 for the G-color component is referred to as a coordinate transformation memory 142(G), and the coordinate transformation memory 142 for the B-color component is referred to as a coordinate transformation memory 142(B). Each of the coordinate transformation memories 142(R), 142(G), and 142(B) includes a control unit (not shown) for reading and writing data.

For executing a process for the lateral chromatic aberration correction, either a low-capacity memory having three ports or a memory with low latency is necessary as a line buffer. In the embodiment, each of the coordinate transformation memories 142(R), 142(G), and 142(B) is configured as an SRAM for 20 lines based on assumption that the maximum amount of shift due to the lateral chromatic aberration is 20 lines in the Y-direction. The size in the X-direction is determined based on resolution. For example, when the resolution is set to video graphic array (VGA) of 640×480, the size in the X-direction equals to 640 dots. As described above, because the color depth is set to 8 bits for each of the RGB color components, each of the coordinate transformation memories 142(R), 142(G), and 142(B) performs writing and reading 8-bit data.

Because each of the coordinate transformation memories 142(R), 142(G), and 142(B) has low capacity, it is preferable to assure a memory area for 20 lines by using an SRAM that has three ports and is mounted on an image processing chip in the imaging apparatus 10. When using a memory with low latency such as an SRAM, it is applicable to perform time sharing so that a memory having a single port can be used as a memory having three ports.

The calculating unit 144 calculates transformed coordinates for the lateral chromatic aberration correction for each of the RGB color components based on a predetermined coordinate transformation equation. The coordinate-transformation coefficient table 146 contains coefficients for the coordinate transformation equation used by the calculating unit 144.

An operation of correcting the lateral chromatic aberration performed by the lateral-chromatic-aberration correcting unit 140 is described below.

Pixel data of each of the RGB color components of a captured image in which lateral chromatic aberration and distortion occur is written in each of the coordinate transformation memories 142(R), 142(G), and 142(B) based on the coordinate data (x, y) in sequence from the first line. When pieces of the pixel data for 20 lines are written in each of the coordinate transformation memories 142(R), 142(G), and 142(B), the pieces of the pixel data are discarded in sequence from the first line, and then pieces of pixel data of subsequent lines are written. In this manner, pieces of the pixel data for the RGB color components for 20 lines at maximum for the coordinate transformation for correcting the lateral chromatic aberration are sequentially stored in each of the coordinate transformation memories 142(R), 142(G), and 142(B).

The coordinate data (x, y) indicates a reading position of a captured image for one frame. On the other hand, because each of the coordinate transformation memories 142(R), 142 (G), and 142(B) is a line buffer for 20 lines, a writing line is cyclically changed. Accordingly, the coordinate data (x, y) cannot be used as a writing address for each of the coordinate transformation memories 142(R), 142(G), and 142(B), so that it is necessary to convert a value of the coordinate data (x, y) into a real address for each of the coordinate transformation memories 142(R), 142(G), and 142(B). However, a configuration used for this conversion is omitted in the configuration shown in FIG. 15. The same is applied to a relationship between transformed coordinate data (X, Y) and a reading address for each of the coordinate transformation memories 142(R), 142(G), and 142(B) during a reading operation, which will be described later.

The calculating unit 144 receives input of the coordinate data (x, y) and calculates transformed coordinate for the lateral chromatic aberration correction for each of the RGB color components based on a predetermined coordinate transformation equation such as a polynomial. Then, the calculating unit 144 outputs the transformed coordinate data (X, Y) for each of the RGB color components. As described above, in the embodiment, the coordinate transformation is performed on the R-color component pixel data and the B-color component pixel data such that they are copied to the position of the G-color component pixel data. Therefore, the calculating unit 144 outputs the input coordinate data (x, y) as the transformed coordinate data (X, Y) for the G-color component pixel data, while the calculating unit 144 converts pieces of the input coordinate data (x, y) into pieces of the transformed coordinate data (X, Y) for the R-color component pixel data and the B-color component pixel data by using a predetermined coordinate transformation equation and outputs the pieces of the transformed coordinate data (X, Y). The above operation is repeated for each piece of the coordinate data (x, y). The pieces of the transformed coordinate data (X, Y) for the R-color component pixel data and the B-color component pixel data are different from each other.

The coordinate transformation equation is represented by Equation (13), when a center point of the screen is assumed to be an original point.

$$X = x + [a(1) + a(2) \times abs(x) + a(3) \times abs(y) + a(4)xy^2] \times x$$

$$Y = y + [b(1) + b(2) \times abs(y) + b(3) \times abs(x) + b(4) \times x^2] \times y \quad (13)$$

where abs(numeral) is an absolute value, a(1) to a(4) and b(1) to b(4) are coefficients of coordinate transformation. The coefficients of coordinate transformation are stored in advance in the coordinate-transformation coefficient table 146. The coordinate-transformation coefficient table 146 is provided for each of different areas, although only one of them is shown in FIG. 15. This is because, while the imaging apparatus 10 has the optical filter 13 in which the different upper limits of the transmitting wavelength are set depending on the distance from the optical axis L, the lateral chromatic aberration needs to be corrected depending on the different upper limits. As described above, the optical filter 13 has the center area Ac having the cutoff wavelength of 950 nanometers and the peripheral area Ap having the cutoff wavelength of 700 nanometers. In the center area Ac having such a long cutoff wavelength, the central wavelength in the R-color component pixel data shifts towards the long wavelength band compared with that in the peripheral area Ap, and the amount of shift of the R-color component pixel data due to the lateral chromatic aberration changes depending on the displacement of the central wavelength. The displacement of the central wavelength occurs because the imaging device 16 has sensitivity to the infrared light in addition to the visible light. Specifically, in the example shown in FIG. 12, if it is assumed that the R-color component pixel data shifts to the position 2(R) due to the lateral chromatic aberration because of the cutoff wavelength of 700 nanometers, the R-color component pixel data shifts to a position 2'(R) due to the lateral chromatic aberration because of the cutoff wavelength of 950 nanometers.

The position to which pixel data of each of the RGB color components shifts can be determined by calculating the amount of shift from the original position because the amount of the distortion and the amount of the lateral chromatic aberration can be determined based on the design data of the imaging optical system 11. A difference in shift positions due to the lateral chromatic aberration in an object image formed with light that has passed through the optical filter 13 can be determined by calculating the amount of shift from the original position, because the amount of the lateral chromatic aberration corresponding to a light wavelength band to be examined can be obtained based on the design data of the imaging optical system 11, a cutoff wavelength of the optical filter 13, and a sensitivity range of the imaging device 16. Considering the above facts, in the embodiment, a set of coefficients of the coordinate transformation $a_1(1)$ to $a_1(4)$ and $b_1(1)$ to $b_1(4)$ corresponding to the center area Ac and a set of coefficients of the coordinate transformation $a_2(1)$ to $a_2(4)$ and $b_2(1)$ to $b_2(4)$ corresponding to the peripheral area Ap are stored in the coordinate-transformation coefficient tables 146 separately. Accordingly, the coordinate-transformation coefficient table 146 (the coefficients of coordinate transformation) corresponding to each of the center area Ac and the peripheral area Ap is used as appropriate.

In each of the coordinate transformation memories 142(R), 142(G), and 142(B), the reading operation is performed, in parallel with the writing operation as described above (to be precise, after a predetermined time elapses), for sequentially reading pixel data of each of the RGB color components based on the transformed coordinate data (X, Y) for each of the RGB color components output by the calculating unit 144 (to be precise, a value obtained by performing address transformation on the transformed coordinate data (X, Y)). At this time, because the coordinate transformation is not performed on the G-color component pixel data, the coordinate transformation memory 142(G) reads the G-color component pixel data at the position same as that to which the G-color component pixel data is written. On the other hand, the coordinate transformation memories 142(R) and 142(G) read the R-color component pixel data and the B-color component pixel data, respectively, at positions shifted by a predetermined amount from the positions to which the R-color component pixel data and the B-color component pixel data are written, that is, at the positions shifted by the amount due to the lateral chromatic aberration.

Through the above processes, each of the coordinate transformation memories 142(R), 142(G), and 142(B) outputs pixel data of each of the RGB color components on which the lateral chromatic aberration has been corrected (the RGB pixel data obtained by correcting positional shifts between each of the RGB color components caused by the lateral chromatic aberration). The process performed by the lateral-chromatic-aberration correcting unit 140 corresponds to a lateral chromatic aberration correction process, and the coordinate transformation memory 142 corresponds to the first coordinate transformation memory used for the lateral chromatic aberration correction process.

Figure 16A:
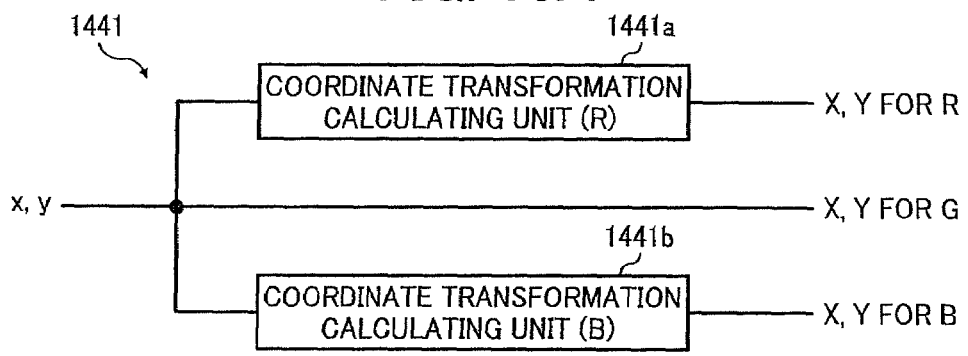
FIGS. 16A to 16C are schematic diagrams of modifications of a lateral-chromatic-aberration coordinate transformation calculating unit shown in FIG. 15.
Figure 16B:
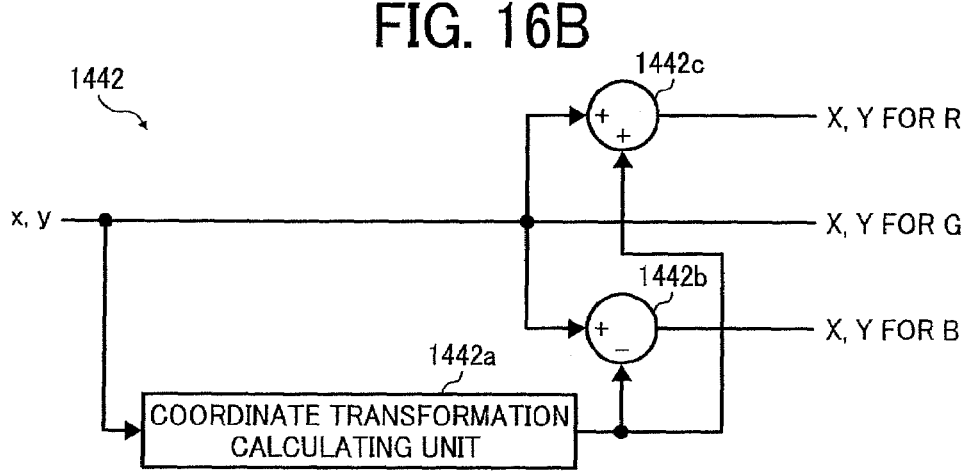
Figure 16C:
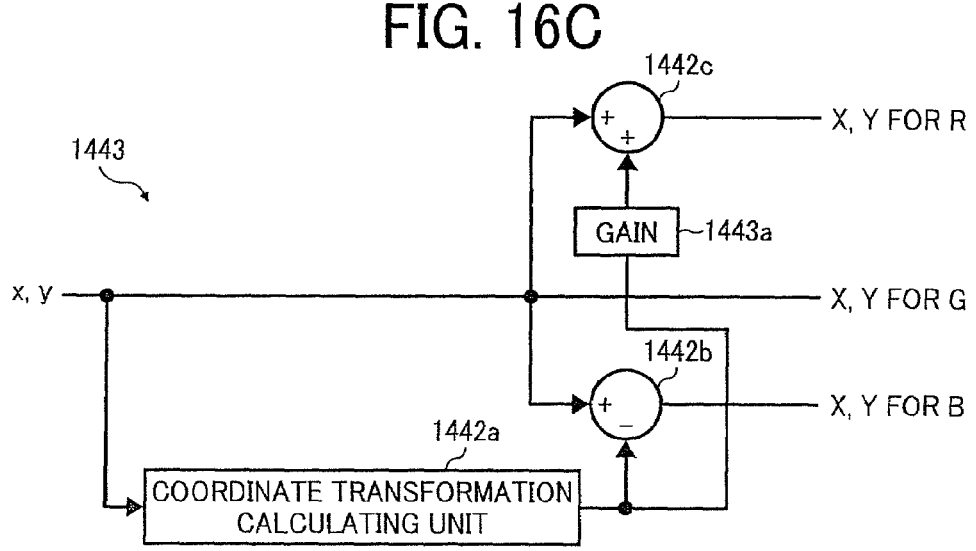

The configuration of the calculating unit 144 of the lateral-chromatic-aberration correcting unit 140 is not limited to the above example. A modification of the calculating unit 144 is described below. FIGS. 16A to 16C are schematic diagrams of modifications of the calculating unit 144. More particularly, FIG. 16A is a schematic diagram of a chromatic-aberration correcting unit 1441, FIG. 16B is a schematic diagram of a chromatic-aberration correcting unit 1442, and FIG. 16C is a schematic diagram of a chromatic-aberration correcting unit 1443.

As shown in FIG. 16A, the chromatic-aberration correcting unit 1441 does not perform coordinate transformation on the G-color component, and outputs the input coordinate data (x, y) as the transformed coordinate data (X, Y) for the G-color component. In the chromatic-aberration correcting unit 1441, a coordinate transformation calculating unit 1441a converts the input coordinate data (x, y) into the transformed coordinate data (X, Y) for the R-color component, and outputs the transformed coordinate data (X, Y). Furthermore, in the chromatic-aberration correcting unit 1441, a coordinate transformation calculating unit 1441b converts the input coordinate data (x, y) into the transformed coordinate data (X, Y) for the B-color component, and outputs the transformed coordinate data (X, Y). With this configuration, only the coordinate transformation calculating unit 1441a for the R-color component and a coordinate transformation calculating unit 1441B for the B-color component are necessary while a coordinate transformation calculating unit for the G-color component is not necessary. Therefore, the size of a corresponding circuit can be reduced.

The chromatic-aberration correcting units 1442 and 1443 shown in FIGS. 16B and 16C are configured based on the fact that the R-color component and the B-color component are generally shifted symmetrically with respect to the G-color component due to the lateral chromatic aberration (see FIG. 12).

As shown in FIG. 16B, in the chromatic-aberration correcting unit 1442, a coordinate transformation calculating unit 1442a calculates a correction amount of the coordinate data (x, y). A subtracting unit 1442b obtains a value by subtracting the correction amount from the coordinate data (x, y), so that the transformed coordinate data (X, Y) for the B-color component can be obtained. An adding unit 1442c obtains a value by adding the correction amount to the coordinate data (x, y), so that the transformed coordinate data (X, Y) for the R-color component data can be obtained. As for the G-color component, similar to the chromatic-aberration correcting unit 1441, the chromatic-aberration correcting unit 1442 outputs the coordinate data (x, y) as the transformed coordinate data (X, Y) for the G-color component without performing coordinate transformation.

As shown in FIG. 19C, the chromatic-aberration correcting unit 1443 is configured so that the symmetrical positions can be considered while the same configuration as that of the chromatic-aberration correcting unit 1442 is maintained. Furthermore, the chromatic-aberration correcting unit 1443 includes a gain circuit 1443a so that the correction amount for the R-color component can be adjusted. The gain amount can be set differently depending on each area. The gain circuit 1443a can be configured to adjust the correction amount for the B-color component. In each of the chromatic-aberration correcting units 1442 and 1443, only one coordinate transformation calculating unit is necessary, so that the size of a corresponding circuit can be more reduced.

The chromatic-aberration correcting unit 1441 can be configured to have a lookup table (LUT) containing correspondence between the coordinate data (x, y) to be input and the transformed coordinate data (X, Y) to be output for each of the R-color component and the B-color component, instead of the coordinate transformation calculating units 1441a and 1441B, so that the transformed coordinate data (X, Y) corresponding to the coordinate data (x, y) can be directly obtained from the LUT. Likewise, each of the chromatic-aberration correcting units 1442 and 1443 can be configured to have an LUT containing correspondence between the input coordinate data (x, y) and the correction amount, instead of the coordinate transformation calculating unit 1442a, so that the correction amount corresponding to the coordinate data (x, y) can be directly obtained from the LUT. With these configurations, the calculations for the coordinate transformation can be omitted, so that the lateral chromatic aberration correction can be performed by using only a memory chip.

Figure 17:
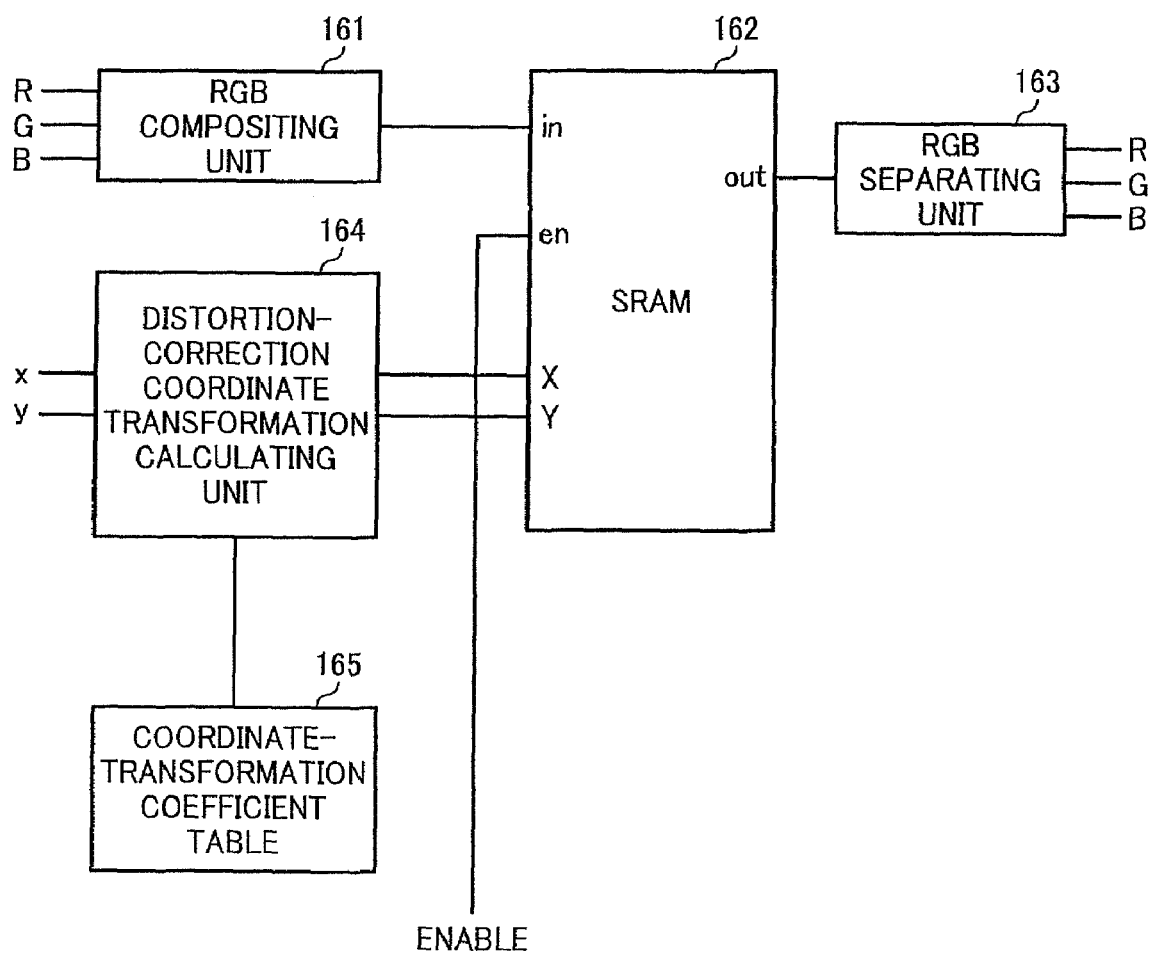
FIG. 17 is a schematic diagram of a distortion correcting unit shown in FIG. 1.

The configuration of the distortion correcting unit 160 is described in detail below. FIG. 17 is a schematic diagram of the distortion correcting unit 160.

The distortion correcting unit 160 includes an RGB compositing unit 161, a distortion-correction coordinate transformation memory (frame memory) 162 (hereinafter, "the coordinate transformation memory 162"), an RGB separating unit 163, a distortion-correction coordinate transformation calculating unit 164 (hereinafter, "the calculating unit 164"), and a coordinate-transformation coefficient table 165.

The RGB compositing unit 161 composites three pieces of pixel data of the RGB color components into a single piece of composite RGB pixel data. The coordinate transformation memory 162 stores therein the composite RGB pixel data used for the distortion correction, and is commonly used for all the RGB color components. The coordinate transformation memory 162 includes a control unit (not shown) that controls writing and reading of data. The RGB separating unit 163 separates the composite RGB pixel data into original color components, that is, three pieces of pixel data of the RGB color components. The calculating unit 164 calculates transformed coordinate for the distortion correction with respect to the composite RGB pixel data by using a predetermined coordinate transformation equation. The coordinate-transformation coefficient table 165 contains coefficients used for the coordinate transformation equation.

As described above, because the distortion occurs such that pixel data of each of the RGB color components largely shifts, a frame buffer having a capacity for storing pixel data corresponding to one screen at a maximum is used for the distortion correction process in the embodiment. Alternatively, because the distortion occurs such that pixel data of each of the RGB color components shifts by the same amount, a single frame buffer corresponding to total bit widths of pixel data of all the RGB color components can be used. In the embodiment, it is assumed that the resolution is set to VGA of 640×480 and the number of bits (color depth) for pixel data of each of the RGB color components is set to 8 bits, so that a DRAM corresponding to 640×480 dots and capable of 24-bit based writing and reading is employed as the coordinate transformation memory 162. In this manner, because the coordinate transformation memory 162 is required to have a large capacity, it is difficult to mount an SRAM in the image processing chip in terms of costs. Furthermore, because a memory having only a single port for all the RGB color components is sufficient, a DRAM mounted outside of the image processing chip can be preferably used as the coordinate transformation memory 162.

Upon sequentially receiving pieces of pixel data of each of the RGB color components (8-bit each) on which the lateral chromatic aberration correction has been performed (in the embodiment, the MTF correction has also been performed), the RGB compositing unit 161 composites the received pieces of the pixel data into a single piece of the composite RGB pixel data (24-bit), and outputs the composite RGB pixel data. The composite RGB pixel data is written in the coordinate transformation memory 162 in sequence from the first line based on the coordinate data (x, y).

Upon receiving the coordinate data (x, y), the calculating unit 164 calculates a common transformed coordinate for the distortion correction for the RGB color components by using the predetermined coordinate transformation equation such as polynomial, and outputs the transformed coordinate data (X, Y). The coordinate transformation equation can be represented by Equation (13) similar to the lateral chromatic aberration correction. However, coefficients of coordinate transformation for the distortion correction are different from those for the lateral chromatic aberration correction. The coefficients of coordinate transformation for the distortion correction are stored in the coordinate-transformation coefficient table 165 in advance. When the distortion correction is performed by using the same Equation (13) as that used in the lateral chromatic aberration correction, and if calculation results related to terms of $x^2$, $y^2$, abs(x), and abs(y) obtained through the lateral chromatic aberration correction are stored in a memory or the like, new calculation need not be performed. As a result, the size of a circuit of the calculating unit 164 can be reduced.

In the coordinate transformation memory 162, the reading operation is performed, in parallel with the writing operation on the composite RGB pixel data (24-bit) by the RGB compositing unit 161 (to be precise, after a predetermined time elapses), for sequentially reading the composite RGB pixel data based on the transformed coordinate data (X, Y) output by the calculating unit 164. The RGB separating unit 163 separates the composite RGB pixel data (24-bit) read from the coordinate transformation memory 162 into pixel data of each of the RGB color components (8-bit).

Through the above processes, the RGB separating unit 163 outputs the pixel data of each of the RGB color components on which the distortion correction, the lateral chromatic aberration correction, and the MTF correction have been performed. In other words, pixel data of each of the RGB color components is copied to the original position (x, y) (the position 1 in the examples shown in FIGS. 15, 17A, and 17B). The process performed by the distortion correcting unit 160 corresponds to a distortion correction process, and the coordinate transformation memory 162 corresponds to the second coordinate transformation memory for the distortion correction process.

In the distortion correction process, it is applicable to provide a lookup table (LUT) containing correspondence between the coordinate data (x, y) to be input and the transformed coordinate data (X, Y) to be output so that the transformed coordinate data (X, Y) corresponding to the coordinate data (x, y) can be directly obtained from the LUT. With this configuration, the calculation for the coordinate transformation can be omitted, so that the distortion correction can be performed by using only the memory chip.

In this manner, the imaging apparatus 10 forms image data of an object image in an area corresponding to the center area Ac of the optical filter 13 with the infrared light as well as the visible light. Therefore, the imaging apparatus 10 can capture an easily-viewable image of an object even in a low-illuminance environment. Because the effect due to the lateral chromatic aberration is small in the center area Ac, that is, the area that is not distant from the optical axis L, sufficient resolution can be assured in the image data of the object image (see FIG. 8) formed with the infrared light. Therefore, degradation in the image of the object can hardly occur, assuring clear visibility of the image. Thus, the imaging apparatus 10 can capture a clear image in an area corresponding to an angle of view close to the optical axis (in the embodiment, the angle of view of 45 degrees or smaller, which corresponds to the center area Ac) even in a low-illuminance environment, e.g., during a nighttime, without using an additional mechanical changeover unit.

Furthermore, the imaging apparatus 10 forms the image data of the object image only with the visible light without using the infrared light in an area corresponding to the peripheral area Ap of the optical filter 13, so that the effect of the lateral chromatic aberration can be reduced (see FIG. 8). In this manner, by arranging the optical filter 13 between the imaging optical system 11 and the imaging device 16, the imaging apparatus 10 can reduce the effect of the lateral chromatic aberration, which generally increases as the distance from the optical axis L increases on the imaging plane because of the structure of the imaging optical system 11. As a result, increase in costs can be prevented. In addition, the imaging apparatus 10 can form a high-resolution image in an area corresponding to a wide angle of view when the image is captured in a normal imaging environment with high illuminance.

In the imaging apparatus 10, the image processing unit 12 corrects the image data based on correction equation corresponding to the upper limit of the transmitting wavelength of the optical filter 13, that is, the correction equation corresponding to each of the cutoff-wavelengths of the center area Ac and the peripheral area Ap of the optical filter 13. Therefore, a highly-clear image of the object can be obtained. Specifically, in the embodiment, the same correction equation (Equation (13)) can be used for both the center area Ac and the peripheral area Ap while only the coefficients are set differently (the coefficients of $a_1(1)$ to $a_1(4)$ and $b_1(1)$ to $b_1(4)$ are set for the center area Ac and the coefficients of $a_2(1)$ to $a_2(4)$ and $b_2(1)$ to $b_2(4)$ are set for the peripheral area Ap) in accordance with each of the cutoff wavelengths. Therefore, a highly-clear image of the object can be obtained with a simple structure.

In the imaging apparatus 10, the lateral chromatic aberration in an image is corrected through the lateral chromatic aberration correction process (by the lateral-chromatic-aberration correcting unit 140), and then the distortion in the image is corrected through the distortion correction process (by the distortion correcting unit 160). Therefore, it is possible to appropriately and easily correct the lateral chromatic aberration and the distortion. As a result, highly-clear image of the object can be obtained. Because the distortion occurs such that each piece of pixel data shifts by the same amount regardless of wavelength, if the distortion correction is performed on image data on which the lateral chromatic aberration has already been corrected, the distortion can be appropriately corrected at one time for all pieces of the pixel data without correcting the distortion of each piece of the pixel data separately.

In this manner, the imaging apparatus 10 can be more preferably used when the imaging optical system 11 is structured to enable a wide angle of view. This is because, while the effects of the lateral chromatic aberration in an area distant from the optical axis L increase when the wide angle of view is enabled, the imaging apparatus 10 can effectively cope with such a situation.

In the imaging apparatus 10, the first coordinate transformation memory (the coordinate transformation memory 142) for correcting the lateral chromatic aberration and the second coordinate transformation memory (the coordinate transformation memory 162) for correcting the distortion are separately arranged. Specifically, the first coordinate transformation memory is structured as either an SRAM with low capacity and low latency or an SRAM with low capacity and multiple ports, and the second coordinate transformation memory is structured a DRAM with a single port, large capacity, and high latency so that the DRAM can be used in common to all color components. Therefore, costs can be reduced. With this configuration, the following problems in the conventional technology can be resolved. That is, the coordinate transformation is performed separately on pixel data of each of the RGB color components to correct the lateral chromatic aberration and the distortion simultaneously, so that it is necessary to mount either a large-capacity memory with low latency at the time of random access or a large-capacity memory having multiple ports, such as an SRAM, for each of the RGB color components. However, such a memory (the large-capacity SRAM or the memory having multiple ports) is extremely expensive, so that cost of an apparatus that enables high resolution by using a large-capacity memory increases.

The imaging apparatus 10 can correct the lateral chromatic aberration while preventing increase in costs. Furthermore, it is possible to obtain a highly-clear image of the object even in a low-illuminance environment.

In the above embodiment, it is explained that the optical filter 13 has the center area Ac having the cutoff wavelength of 950 nanometers and the peripheral area Ap having the cutoff wavelength of 700 nanometers. However, the configuration of the optical filter 13 is not limited to the above example as long as the optical filter 13 is structured so that the upper limit of the transmitting wavelength decreases as the distance from the optical axis L increases such that infrared light is allowed to pass through an area corresponding to the optical axis L and is not allowed to pass through an area most distant from the optical axis L. For example, the optical filter can have three or more areas having different upper limits of the transmitting wavelength in a concentric manner with respect to the optical axis L. Furthermore, it is applicable to structure the optical filter such that the upper limit of the transmitting wavelength is continuously reduced as the distance from the optical axis L increases. In this configuration, it is preferable to set the upper limit of the transmitting wavelength so that the infrared light is allowed to pass only an area in which viewability of a captured image can hardly by disturbed due to the effect of the lateral chromatic aberration.

Furthermore, it is explained that the cutoff wavelength (the upper limit of the transmitting wavelength) of an area most distant from the optical axis L (the peripheral area Ap) in the optical filter 13 is set to 700 nanometers, which is known as a boundary wavelength between the visible region and the infrared region, so that the infrared light can be cut off. However, the cutoff wavelength is not limited to the boundary wavelength of 700 nanometers as long as the infrared light can be cut off practically so that the viewability of a captured image can be assured without degradation due to the effect of the lateral chromatic aberration. For example, it is applicable to set the cutoff wavelength of the area most distant from the optical axis L (the peripheral area Ap) in the optical filter 13 to 650 nanometers. Because the imaging device needs to detect a red-color component to form a color captured image, it is preferable to set the cutoff wavelength of the area most distant from the optical axis L (the peripheral area Ap) in consideration of the wavelength necessary for detecting a wavelength of a red-color component and the wavelength that must be cut off to assure the viewability of the captured image without degradation due to the effect of the lateral chromatic aberration.

Moreover, while it is explained that the imaging device 16 has a color filter having Bayer color filter array, the present invention is not limited to this example. For example, the imaging device can have a color filter having CMYK array, RGB+Ir (infrared) array, or the like. With the imaging device having four-color filter array, either a memory with lower latency or a RAM having four ports is necessary for performing the lateral chromatic aberration correction. Therefore, compared with a case in which three RGB colors are used as in the embodiment, the effects obtained by separately mounting the coordinate transformation memory for the lateral chromatic aberration correction and the coordinate transformation memory for the distortion correction can be more enhanced.

Furthermore, while it is explained that the lateral-chromatic-aberration correcting unit 140 corrects the lateral chromatic aberration and the distortion correcting unit 160 corrects the distortion in the image processing unit 12, the present invention is not limited to this configuration as long as image data can be corrected based on the correction equation corresponding to the upper limit of the transmitting wavelength set in the optical filter.

The present invention is not limited to the specific details and representative examples described above. Accordingly, various modifications can be made without departing from the scope of the present invention.

According to one aspect of the present invention, the effect of the lateral chromatic aberration, which increases as the distance from the optical axis increases in the imaging optical system, can be reduced by using the optical filter structured such that the upper limit of the transmitting wavelength decreases as the distance from the optical axis increases. Furthermore, the light intensity available by the imaging device increases as the distance from the optical axis decreases, so that highly-clear image can be captured in a low-illuminance environment.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging apparatus comprising:
   an imaging optical system that forms an image of an object on an imaging device;
   an image processing unit that generates image data based on an output signal from the imaging device, corrects the image data, and outputs corrected image data; and
   an optical filter arranged between the imaging optical system and the image processing unit,
   wherein the optical filter is structured such that an upper limit of a transmitting wavelength decreases as a distance from an optical axis of the imaging optical system increases on an imaging plane of the imaging device so that a light in an infrared region is transmitted on the optical axis and cut off at a position farthest away from the optical axis on the imaging plane, and
   the image processing unit corrects the image data based on a correction equation corresponding to the upper limit of the transmitting wavelength.

2. The imaging apparatus according to claim 1, wherein the optical filter has a plurality of areas each having a different upper limit of the transmitting wavelength in a concentric manner with respect to the optical axis.

3. The imaging apparatus according to claim 1, wherein the correction equation is used for correcting a lateral chromatic aberration corresponding to a wavelength range supported by the imaging optical system.

4. The imaging apparatus according to claim 3, wherein the image processing unit includes a first correcting unit that corrects the lateral chromatic aberration in the image data based on the correction equation, and a second correcting unit that corrects a distortion in image data obtained after the lateral chromatic aberration is corrected by the first correcting unit.

5. The imaging apparatus according to claim 4, wherein the image processing unit further includes a first coordinate transformation memory for the first correcting unit, and a second coordinate transformation memory for the second correcting unit.

6. An imaging apparatus comprising:
an imaging optical system that forms an image of an object on an imaging device;
an optical filter arranged between the imaging optical system and the imaging device; and
an image processing unit that generates image data based on an output signal output from the imaging device,
wherein the optical filter is structured such that an upper limit of a transmitting wavelength decreases as a distance from an optical axis of the imaging optical system increases, and
wherein the image processing unit corrects an aberration in the image data based on a correction equation corresponding to the upper limit of the transmitting wavelength.

7. An image correction method for an imaging apparatus, including an imaging optical system that forms an image of an object on an imaging device; an optical filter arranged between the imaging optical system and the imaging device; and an image processing unit that generates image data based on an output signal output from the imaging device, wherein the optical filter is structured such that an upper limit of a transmitting wavelength decreases as a distance from an optical axis of the imaging optical system increases, the image correction method comprising:
generating image data based on an output signal from the imaging device; and
correcting an aberration in the image data based on a correction equation corresponding to the upper limit of the transmitting wavelength.

8. The imaging apparatus according to claim 6, wherein the optical filter is structured such that an upper limit of a transmitting wavelength gradually decreases as a distance from an optical axis of the imaging optical system increases.

9. The image correction method for an imaging apparatus according to claim 7, wherein the optical filter is structured such that an upper limit of a transmitting wavelength gradually decreases as a distance from an optical axis of the imaging optical system increases.

* * * * *